Figure 1:
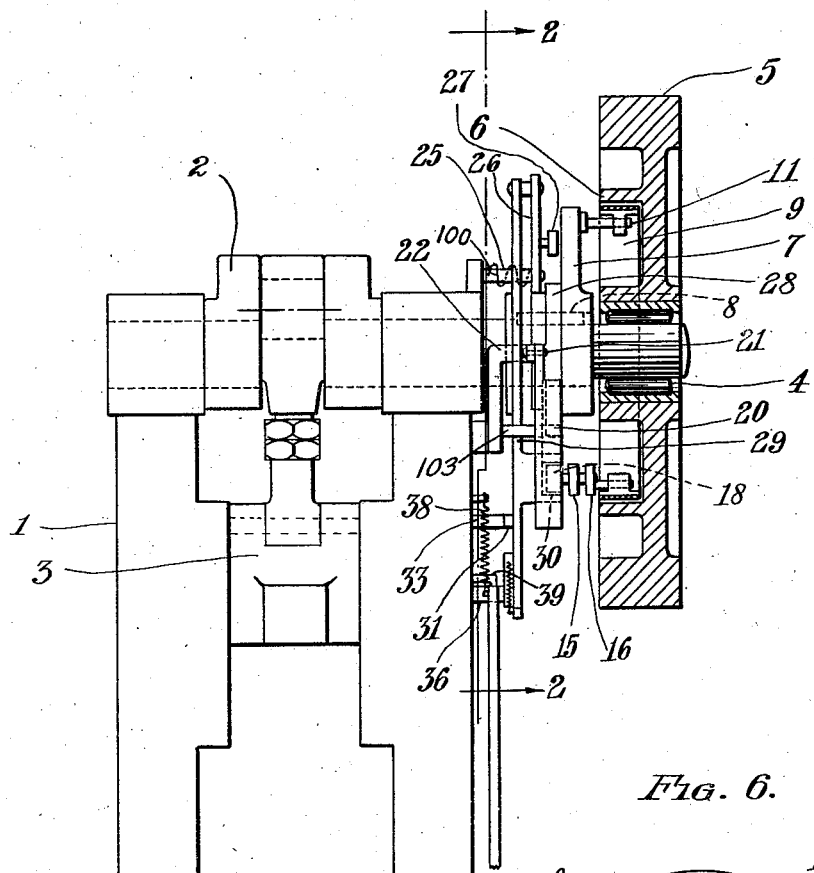

Nov. 26, 1946.  E. KANN  2,411,543

POWER PRESS

Filed March 14, 1942  3 Sheets-Sheet 1

INVENTOR.
EDUARD KANN

BY

AGENT.

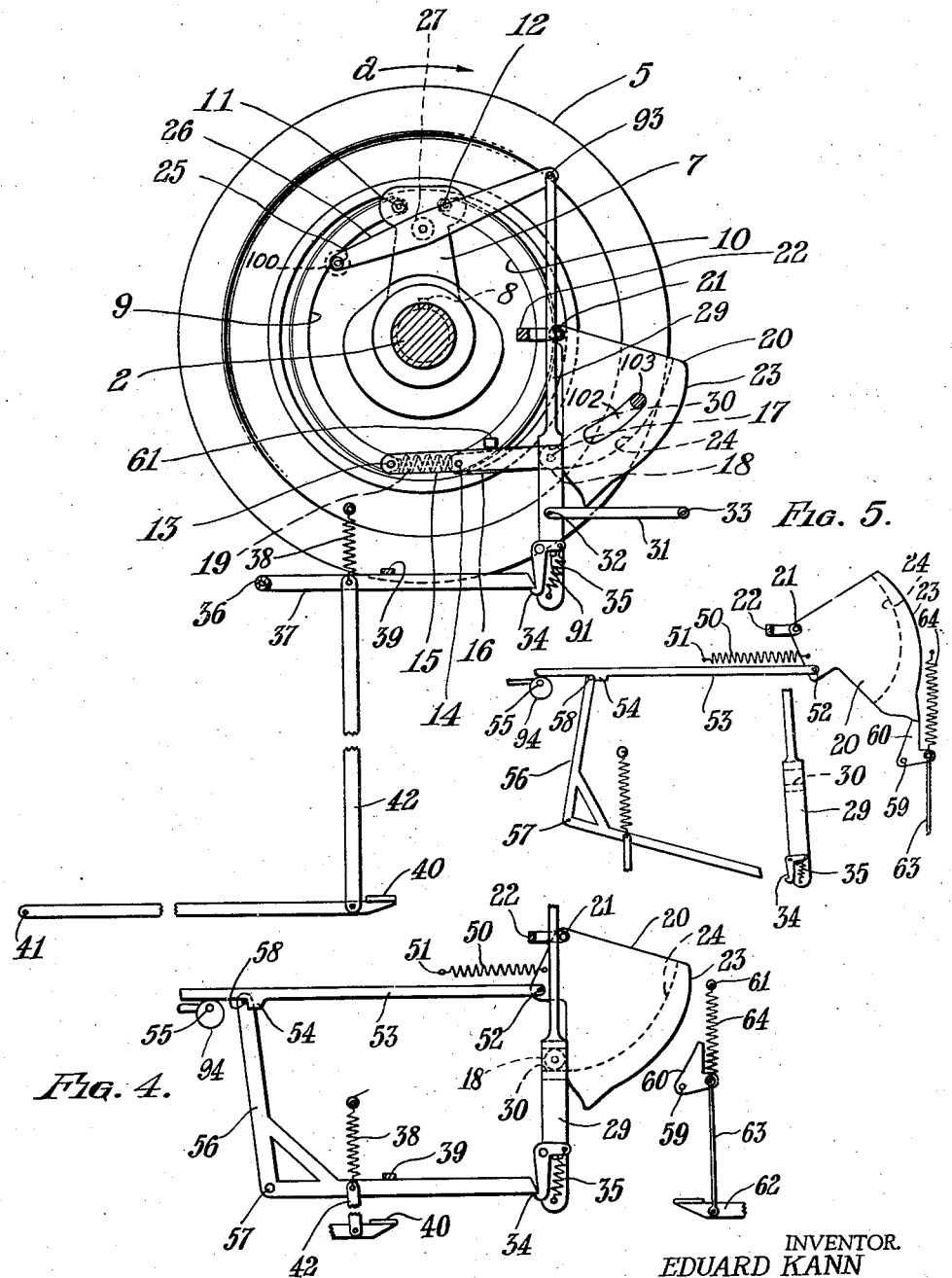

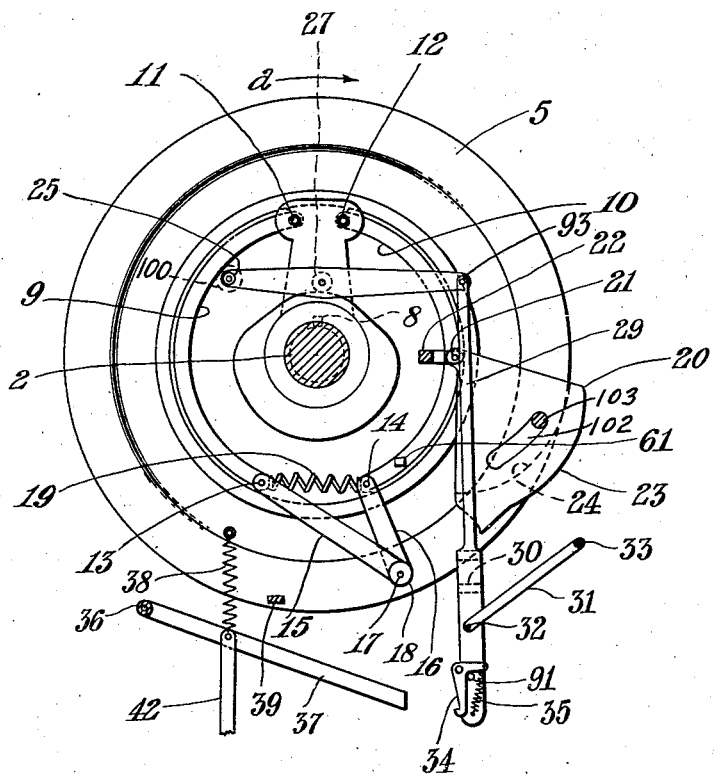
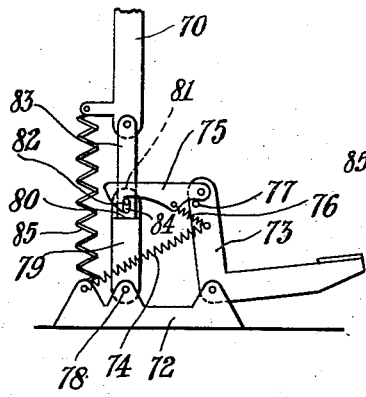
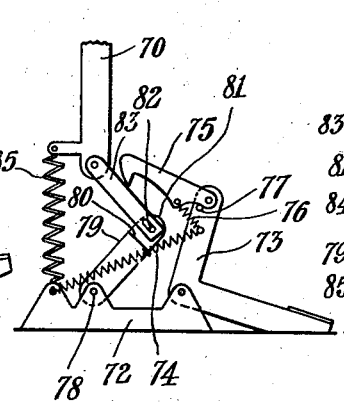
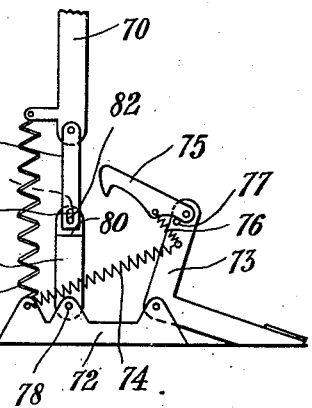

Patented Nov. 26, 1946

2,411,543

UNITED STATES PATENT OFFICE 2,411,543

POWER PRESS

Eduard Kann, Summit, N. J., now by judicial change of name to Edward Cann

Application March 14, 1942, Serial No. 434,708

11 Claims. (Cl. 192—33)

My invention relates to power presses and more particularly to the clutch mechanisms and control mechanisms of such presses.

The clutch mechanisms employed in power presses of either the crank or excentric type are one of the most important parts of the presses and it has always been difficult to provide a mechanism which operates satisfactorily and at the same time is safe. This difficulty is due mainly to the fact that the crankshaft, which is normally stationary, must be coupled almost instantaneously to the flywheel which revolves continuously at a speed of from 50 to 500 R. P. M.

Although it is generally considered a faulty mechanical principle to use a jaw clutch in applications such as this, it has been common practice to provide power presses with a jaw or similar clutch such as a bolt clutch or a revolving key clutch. However, these positive-acting and hammering clutches have always given, and are still giving, considerable trouble when used in power presses and are the cause of thousands of accidents resulting from so-called "repeat strokes," i. e. unexpected engagements due to defects in the clutch mechanism. Apparently press-builders have adhered to this faulty principle and have used such clutches only because of the necessity of obtaining an instantaneous engagement. More particularly, the time between the moment of tripping the clutch and the moment at which full torque is required must be less than the time of one half revolution.

Friction clutches of the usual design are unsatisfactory for presses which operate at speeds of 50 R. P. M. and above, and in practice only slow-running heavy presses have been equipped with a friction clutch. Although friction clutches are used to some extent in fast-running presses, they have proven unsatisfactory because the powerful friction clutches necessary for this purpose are generally too heavy to operate properly. To overcome this difficulty it has been proposed to use compressed air, hydraulic operation or servo mechanisms, some of which use screwing or wedging members by which more force is applied to the friction members when the resistance met by the machine increases. However, with such mechanisms an indefinite torque may be applied, and this torque may exceed the torque for which the machine is designed.

The main object of my invention is to overcome the above difficulties and to provide a power press which has a friction clutch mechanism which operates satisfactorily under all conditions.

A further object is to provide a power press clutch mechanism which is safe and will not cause accidents due to "repeat strokes."

A still further object is to provide a clutch control mechanism whereby the press can be readily used for either single stroke operation or for continuous operation.

Another object is to provide a clutch mechanism which is operated almost entirely by the power supplied to the press and can be controlled with little manual effort.

A still further object is to provide a control mechanism which can be used on various types of presses and which is safe in operation and requires little force to operate.

Further objects and advantages of my invention will appear as the description progresses.

In accordance with the invention I use a friction clutch, preferably of the servo type, and control the same by a toggle mechanism which, when in a substantially dead center or inoperative position, holds the clutch in its disengaged position against the action of a spring which tends to place the clutch in its engaged position.

In accordance with the invention the clutch is tripped by moving the toggle into such a position that the clutch will be almost instantaneously engaged by the action of the spring. For this purpose I provide control means comprising a so-called box-rod which is adapted to hold the toggle in its closed position and to move the same into its operative position.

To disengage the clutch I provide a cam member which is adapted to be placed in the path of the toggle, which is rotated when the clutch is engaged, so as to close the toggle and place the same under the control of the box-rod.

In one embodiment of the invention I provide a lever mechanism to either actuate the box-rod for single stroke operation or to move the cam member out of the path of the toggle for repeat stroke operation.

In single stroke operation it is necessary that the box-rod be returned to the position in which it receives the toggle from the cam member and for this purpose the box-rod is connected to a cam secured to the shaft of the press.

The clutch is preferably in the form of an internally-expanding friction brake which is forced into its engaged position by a spring and is held in its disengaged position by the toggle mechanism. When the clutch revolves during a stroke the toggle engages the cam member which places the toggle in its locked position in which it is held by the box-rod. When it is desired to operate the press the box-rod is moved so as to release the toggle and permit the spring to expand the friction brake.

Figure 6:
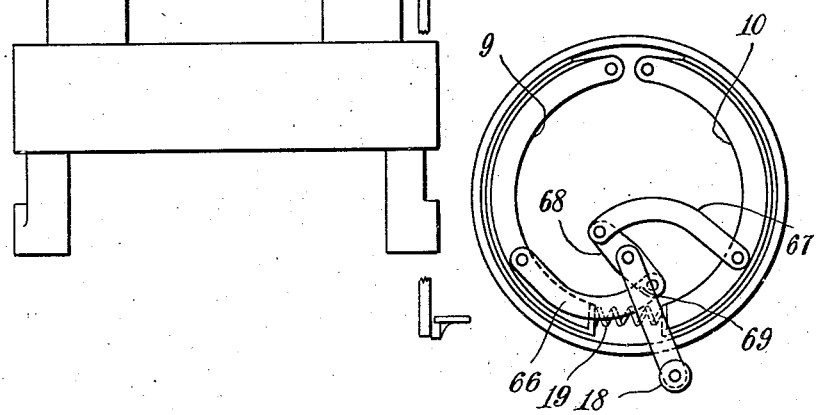

In order that the invention may be clearly understood and readily carried into effect, I shall describe the same in more detail with reference to the accompanying drawings in which:

Figure 1 is a partly-sectionized front elevation of a power press embodying my invention, Fig. 2 is a sectional view taken along line 2—2 of Figure 1, Fig. 3 is a sectional view similar to Fig. 2 but with the parts in another position and with some of the parts omitted, Fig. 4 is a side view of a control mechanism according to the invention, Fig. 5 is a side view on a slightly reduced scale of the control mechanism of Fig. 4 with the parts in another position, Fig. 6 is a front view of a friction clutch according to another embodiment of the invention, and Figs. 7, 8 and 9 are side views with the parts in different positions of a toggle control mechanism.

The power press shown in Fig. 1 has a frame 1 which may be of the usual design. Rotatably mounted upon the upper portion of the frame by suitable bearings is a driven member in the form of a crank shaft 2 to which is rotatably secured a ram 3 guided so as to reciprocate in a vertical direction. As this portion of the press may be of any of the usual designs, further description or more detailed illustrations of the same is believed to be unnecessary.

Mounted on the extending end of the crank shaft 2 by means of roller bearings 4 is a driving member in the form of a flywheel 5, which may be driven in the usual manner by a belt (not shown). Flywheel 4 is provided with a cylindrical rib 6 whose inner surface forms part of the clutch mechanism according to the invention.

In accordance with the invention the press is provided with a friction clutch for connecting the shaft 2 to the flywheel 5. As shown more clearly in Figures 2 and 3, the clutch comprises two friction shoes 9 and 10 which may be provided on their outer surfaces with any of the well-known friction linings. As shown in Fig. 2 the friction shoe 9 has its upper end rotatably mounted on a stud 11 secured to a spider 7 which is fixedly secured to the end of shaft 2 by a key 8. Similarly friction shoe 10 has its upper end rotatably mounted on a stud 12 secured to the spider 7. The friction shoe 9 has its lower end pivoted at 13 to one end of a link 15 which has its other end connected to one end of a link 16 whose other end is pivoted at 14 to the lower end of the friction shoe 10. The links 15 and 16 are rotatably secured together at their other ends by a pin 17 which carries a roller 18 later to be referred to. The lower ends of friction shoes 9 and 10 are forced apart by a compression spring 19.

It will be noted that links 15 and 16 and spring 19 form a toggle mechanism, which when in its inoperative or locked position shown in Fig. 2, holds the friction shoes 9 and 10 in their open or disengaged position.

It will be noted that link 16 engages a stop 61 secured to the friction shoe 10 and that in this position the connecting point of links 15 and 16 is slightly past dead center whereby the spring 19 holds the links in position.

If the roller 18 is given a small displacement downward, the spring 19 will force the friction shoes 9 and 10 against the inner surface of rib 6 to thereby couple the driving pulley 5 to the shaft 2 and at the same time will move links 15 and 16 into the position shown in Fig. 3. Because of this toggle arrangement only a very small force is usually required to actuate the clutch or to hold the same in its disengaged position. Furthermore, the clutch is engaged with a predetermined pressure which depends upon the compression of spring 19. Due to the use of the toggle mechanism the full pressure of spring 19 will be effective almost instantaneously. Thus, the friction between the shoes 9 and 10 and the inner surface of the rib 6 will reach its maximum value at once and there will be no gradually increasing friction as in other types of clutches.

The control mechanism for controlling the friction clutch comprises a cam member 20 pivotally mounted at 21 (Figures 2 and 3) to a bracket 22 secured to the frame 1 (Fig. 1). As shown in Figs. 1 and 2 the member 20 has an extension 23 provided with a curved surface 24 adapted to be engaged by the roller 18 when the toggle mechanism comprising links 15 and 16 is in its open position shown in Fig. 3. Cam member 20 is prevented from rotating clockwise from the position shown in Figs. 2 and 3 by a stationary pin 103 which extends through a curved slot 102 in member 20. Pin 103 has one end secured to the frame 1 (see Fig. 1).

Pivotally secured at one end to a stud 25 fixedly secured to frame 1 (see Figs. 1 and 2) is a lever 26 provided at its central part with a roller 27 adapted to be engaged by a cam 28 fixedly secured to shaft 2. Cam 28 is adapted to act upon roller 27 so as to lift lever 26 into the position shown in Fig. 2 during each revolution of shaft 2. A spiral spring 100 (see Fig. 2) mounted on stud 25 and having one end fixed to the stud and its other end secured to the lever 26 prevents rod 29 from falling from the position shown in Figure 2. Although the spring 100 may lift the lever 26, the cam 28 provides a positive lifting of this lever especially during the rapid operation of the press. Pivoted to the other end of lever 26 at 93 is a so-called box-rod 29 provided near its central portion with a groove 30 adapted to receive roller 18 as it leaves the surface 24 of extension 23. A link 31 has one end pivoted at 32 to the box-rod 29 and has its other end pivotally mounted on a pin 33 which is fixedly secured to frame 1. Link 31 serves to pull the lower end of rod 29 to the right when the rod is moved downward in a manner later to be described.

As shown more clearly in Fig. 2 the lower end of rod 9 is provided with a catch 34 which is held in the position shown against a stop 91 by a tension spring 35 having one end secured to rod 29 and its other end secured to an extension of the catch 34. Pivotally mounted at one end to a pivot 36 secured to frame 1 is a rod 37 whose other end is adapted to be engaged by the catch 34. Rod 37 is held in the position shown in Fig. 2 by a tension spring 38 having its upper end secured to a stud fixed to frame 1 and a stop 39 also fixed to frame 1. Rod 37 is adapted to be rotated in a clockwise direction by a foot pedal 40 pivoted at 41 and connected to member 37 by a link 42.

The operation of the press will be described with reference to Figs. 2 and 3. In Fig. 2 the clutch is held in its disengaged position because the roller 18 is held within the groove 30, and the flywheel 5 is being continuously rotated in the direction indicated by arrow $a$. When it is desired to trip the press, the foot pedal 40 is depressed to thereby pull the box-rod 29 downward. Rod 29 pulls the roller 18 downward to thereby unlock the toggle formed by links 15 and 16 and during its downward movement rod 29 is drawn to the right by the member 31. As a result the roller 18 will leave groove 30 and will be moved into the position shown in Fig. 3 by the action of spring 19. The spring 19 will thus be free to force the friction shoes 9 and 10 into contact with the inner surface of rib 6. As a result the shaft 2 will be immediately connected to the flywheel 5 and the press will start its stroke.

From the above it will be noted that in Fig. 2 the clutch is securely held in its open position without the exertion of any appreciable force by the control mechanism. In addition, it will be noted that very little force need be exerted by the control mechanism in order to engage the clutch. More particularly, it is only necessary to trip the toggle mechanism by moving the roller 18 out of the position shown in Fig. 2.

During the stroke the toggle 15—16 rotates while the links 15 and 16 and roller 18 remain in the relative positions shown in Fig. 3. The cam 28 also revolves to return the rod 29 to the position shown in Fig. 2. Near the end of the stroke the roller 18 strikes surface 24 and is guided by this surface into the groove 30. During this action the links 9 and 10 are moved into the position shown in Fig. 2, whereby the friction shoes 9 and 10 are disengaged from the surface of rib 6. The apparatus is thus returned to the position shown in Fig. 2 and a second stroke can be effected by depressing the foot pedal 40.

It should be noted that the connection between the driving pulley 5 and the crankshaft 2 is not a solid mechanical connection, but is a friction coupling which will slip if an obstruction of any kind occurs. This slipping action allows one to solve the overload relief problem in a simple and reliable manner. An accurately calculated and predetermined torque will be transmitted if the spring 19 is correctly calculated and adjusted. An arrangement for adjusting the compression of spring 19 as well as one for adjusting shoes 9 and 10 to take up the wear of the lining should be incorporated in the clutch. However, as both of these may be of the usual design it is believed that a detailed description or illustration of the same is unnecessary.

It should be noted that to prevent injury to the operator by the positive lifting of the box-rod 29 by cam 28, the foot pedal 40 is not directly connected to this box-rod. On the contrary the actuating mechanism 40—42—37 is automatically disengaged from the box-rod 29 and is connected thereto only when the rod 29 is in the position shown in Fig. 2, i. e. after the operator has removed his foot from pedal 40.

Figures 4 and 5 illustrate a mechanism which can operate the press for either single or repeat strokes and in these figures the parts shown in Figs. 1 to 3 are indicated by the same reference numerals. As shown in Fig. 4 the cam member 20 is rotatably secured at 21 to the bracket 22 and is held in the position shown by a tension spring 50 having one end fixed at 51. Pivoted to member 20 at 52 is an arm 53 provided with a protuberance 54. The free end of arm 53 rests upon an eccentric member 94 which is rotatable about a fixed pivot 55 and which serves to place the apparatus in condition for either a single stroke or a continuous stroke operation. A bell crank lever 56 is rotatably mounted on a fixed pivot 57 and is provided with a pin 58 engaging the protuberance 54. The other end of crank 56 engages the catch 34 and has connected to it the spring 38 and members 42 and 40 of Fig. 2.

Mounted on a fixed point 59 is a catch 60 which serves to hold the cam member 20 in the "repeat-stroke" position shown in Fig. 5. The catch 60 is held in the position shown in Fig. 4 by a tension spring 64 having one end fixed at 61 and is adapted to be rotated clockwise by a foot pedal 62 connected thereto by a rod 63.

In Figs. 4 and 5 the eccentric 94 is set for continuous or repeat stroke operation. When foot pedal 40 is depressed the lower arm of lever 56 actuates the box-rod 29 in the same manner as described above in connection with Figs. 2 and 3 to thereby engage the clutch. However, at the same time pin 58 moves arm 53 to the right to thereby swing the cam member 20 into the repeat stroke position shown in Fig. 5 in which this member is held by the catch 60. Thus, the cam surface 24 of the member 20 is placed out of the circular path of the roller 18 and the clutch will not be disengaged. After the desired number of strokes have been made the clutch may be disengaged by pressing pedal 62 to thereby release the catch 60.

When it is desired to use the press for single stroke operation, the eccentric 94 is rotated through 180° to thereby lift the end of arm 53 and remove the protuberance 54 from the path of pin 58. In this case the apparatus operates the same as described above in connection with Figs. 2 and 3.

It will be noted that also in Figs. 4 and 5 the box-rod does not engage the lever 56 when the foot pedal 40 is being held down and this prevents injury to the operator.

The clutch illustrated in Fig. 6 is similar to that of Figs. 1, 2 and 3 and has similar parts indicated by the same reference numerals. However, in Fig. 6, the friction shoes 9 and 10 have their free ends connected by links 66, 67 and 68 and the roller 18 is secured to one end of a lever 69 whose other end is fixedly secured to the link 68.

If the tripping of the clutch requires a large amount of force, for instance if the spring 19 of Fig. 2 is very strong, I prefer to use a "servo-trigger" tripping mechanism of the type illustrated in Figs. 7, 8 and 9. This mechanism, which can be used to trip other types of presses, can be directly connected to the box-rod 29 of Fig. 2 and in Figures 7, 8 and 9 the reference numeral 70 indicates an extension of the box-rod 29. It should be noted that the mechanism of Figs. 7, 8 and 9 replaces the tripping mechanism 34—37—40—42 of Fig. 2.

The mechanism of Figs. 7, 8 and 9 comprises a base 72 upon one end of which is pivoted a foot-operated bell crank lever 73 held in the position shown in Fig. 7 by a tension spring 74 and provided at its upper end with a latch 75 held against a stop 77 by a tension spring 76. Pivoted to base 72 at 78 is a link 79 provided at its upper end with a flat surface 80 and an offset extension 81 provided with a pin 82. Pivoted at one end to the member 70 is a link 83 having a flat lower surface engaging the flat surface 80. The lower end of the link 83 has a small slot 84 into which the pin 82 fits and a tension spring 85 connected between link 70 and the base 72 hold the linkage in the position shown.

In the position shown in Fig. 7 the box-rod 29 is in the position shown in Fig. 2 and when it is desired to trip the press it is only necessary to exert a slight downward pressure on the foot pedal 73 to thereby pull the toggle mechanism 79—83 off dead center. The spring 85 continues the action to place the toggle mechanism in the position shown in Fig. 8 in which the box-rod 29 assumes the position shown in Fig. 3. The spring 85 should have sufficient tension to ensure that the box-rod and roller 18 will be pulled downward under all conditions.

When the press makes a stroke, the box-rod 29 is lifted by cam 28, as described in connection with Figs. 1, 2 and 3, with the result that the linkage 79—83 is first lifted into the position shown in Fig. 9 and is then slightly lowered so that the lower surface link 83 rests upon the flat surface 80 (see Fig. 7).

It will be noted that the resetting of the tripping mechanism, and the stretching of spring 85 is effected by the press itself and that only a slight manual effort is required to trip the press. In addition there is no danger of injury to the operator, because the pin 82 will not engage the latch 75 when the crank 73 is held down by the operator's foot.

It will be noted that in my press as the pressure on the friction surfaces of the clutch is not positive but is applied by a spring, a predetermined pressure resulting in a predetermined torque is easily obtained. In addition release of the clutch shoes is positive and is obtained by the motion and the driving power of the press. Furthermore, operation of the clutch is very light as a result of a very simple servo-action, engaging and disengaging are both practically instantaneous, and there is very little slipping during the engagement.

Some presses give difficulties when it is necessary to rotate the crankshaft backward by hand. This is sometimes required by the user but often forgotten by the builder of the press. In the design described above reverse motion is quite feasible. Once the clutch is engaged (and this can be done by moving the box-rod) the flywheel may be turned back and the crankshaft follows. No damage is done to the mechanism and when roller 18 in its swung-out position hits the cam member 20 from beneath, it forces the cam member outward and passes by. For this purpose the lower end of the cam is given a suitable shape.

With some of the existing positive-acting clutches damage can be done by overrunning. This is the case if the crankshaft temporarily runs faster than the flywheel due to the weight of the ram during downward stroke or to the back pressure of the die cushion during upward strokes. If this is not prevented by a pawl the overrunning may cause severe damage to the clutch mechanism. With the friction clutch according to my invention and as described above overrunning causes no difficulty because the clutch couples the flywheel to the crankshaft equally well in either direction.

My press may be provided with interlocking guards which not only interlock the actuating mechanism, but also the crankshaft (see also Proceedings National Safety Congress, London 1939 and American Machinist, September 18, 1940). This interlocking of the crankshaft makes an overload relief necessary. If the latter is added as an extra feature to a press having the usual clutch mechanism, it would make the application of this safety device too expensive. The instantaneous friction clutch described above facilitates the application of safety devices, because it obviates the old positive clutch and at the same time acts as an overload relief.

Although I have described my invention with reference to specific constructions I do not desire to be limited thereto because constructional variations will readily appear to one skilled in this art.

What I claim is:

1. In a power press having a driving member and a driven member, a clutch mechanism for connecting the driven member to the driving member and comprising a friction shoe having an engaged position in which it engages said driving member and a disengaged position, a resilient member acting upon said shoe to force the same into its engaged position, and means to hold said friction shoe in its disengaged position against the action of said resilient member, said latter means including a toggle mechanism connected to said friction shoe and rotatable therewith and being in a substantially-locked position when the shoe is in the disengaged position, and means to direct said toggle from its engaged position into its substantially-locked position during rotation of the clutch mechanism, said latter means including a member adapted to be placed in the path of said toggle during the rotation of the friction shoe and toggle with the driving member.

2. In a power press having a driving member and a driven member, a clutch mechanism for connecting the driven member to the driving member and comprising a friction shoe having an engaged position in which it engages said driving member and a disengaged position, a resilient member acting upon said shoe to force the same into its engaged position, and means to hold said friction shoe in its disengaged position against the action of said resilient member, said latter means including a toggle mechanism connected to said friction shoe and rotatable therewith and being in a substantially-locked position when the shoe is in the disengaged position, means to hold said toggle mechanism in its substantially-locked position, and means to move said toggle mechanism into its substantially-locked position and to direct the mechanism while in said position into said holding means during rotation of the clutch mechanism.

3. In a power press having a driving member and a driven member, a clutch mechanism for connecting the driven member to the driving member and comprising an internally-expanding friction shoe adapted to engage said driving member, a resilient member arranged to force said shoe into its engaged position, and means to hold said friction shoe in its disengaged position against the action of said resilient member including a toggle mechanism connected to said friction shoe and being in a substantially-locked position when said shoe is disengaged, a box-rod to receive said toggle and hold the same in a substantially-locked position, and a cam-like member to direct the toggle from its engaged position into said box-rod during rotation of the clutch mechanism.

4. In a power press having a driving member and a driven member, a clutch mechanism for connecting the driven member to the driving member and comprising a friction shoe having an engaged position in which it engages said driving member and a disengaged position, a resilient member acting upon said shoe to force the same into its engaged position, and means to hold said friction shoe in its disengaged position against the action of said resilient member, said latter means including a toggle mechanism connected to said friction shoe and being in a substantially-locked position when the shoe is in the disengaged position, means to direct said toggle mechanism into a substantially-locked position during rotation of the clutch mechanism, and means to move said toggle mechanism out of its substantially-locked position to thereby trip the press.

5. In a power press having a driving member and a driven member, a clutch mechanism for connecting the driven member to the driving member and comprising a friction shoe adapted to engage said driving member, a resilient member arranged to force said shoe into its engaged position, and means to hold said friction shoe in its disengaged position against the action of said resilient member including a toggle mechanism connected to said friction shoe and being in a substantially-locked position when said shoe is disengaged, said toggle mechanism moving in a circular path when said clutch mechanism is engaged, a cam-like member to direct the toggle from its engaged position into a substantially-locked position during rotation of the clutch mechanism, and means to place said cam-like member into and out of the path of said toggle mechanism.

6. In a power press having a driving member and a driven member, a clutch mechanism for connecting the driven member to the driving member and comprising a friction shoe having an engaged position in which it engages said driving member and a disengaged position, a resilient member acting upon said shoe to force the same into its engaged position, and means to hold said friction shoe in its disengaged position against the action of said resilient member, said latter means including a toggle mechanism connected to said friction shoe and being in a substantially-locked position when the shoe is in the disengaged position, a box-rod for holding said toggle mechanism in its substantially-locked position and to remove the same therefrom when the press is tripped, a cam-like member to direct said toggle from its engaged position into its substantially-locked position during rotation of the clutch mechanism, and means actuated by said driven member to place said box-rod into a position in which it receives the toggle mechanism from the cam-like member.

7. In a power press having a driving member and a driven member, a clutch mechanism for connecting the driven member to the driving member and comprising a friction shoe having an engaged position in which it engages said driving member and a disengaged position, a resilient member acting upon said shoe to force the same into its engaged position, and means to hold said friction shoe in its disengaged position against the action of said resilient member, said latter means including a toggle mechanism connected to said friction shoe and being in a substantially-locked position when the shoe is in the disengaged position, means to hold said toggle mechanism in its substantially-locked position, said latter means comprising a box-rod having a position in which said toggle is held in its substantially-locked position and a second position in which the toggle mechanism is free from the member, means actuated by the driven member to return the box-rod to its first-mentioned position, and means to direct said toggle mechanism during rotation of the clutch mechanism into said box-rod.

8. In a power press having a driving member and a driven member, a clutch mechanism for connecting the driven member to the driving member and comprising a friction shoe adapted to engage said driving member, a resilient member arranged to force said shoe into its engaged position, and means to hold said friction shoe in its disengaged position against the action of said resilient member including a toggle mechanism connected to said friction shoe and being in a substantially-locked position when said shoe is disengaged, a box-rod to hold the toggle mechanism in and remove the same from a substantially-locked position, a cam-like member to direct the toggle into said box-rod during rotation of the clutch mechanism, and a second toggle mechanism for actuating said box-rod.

9. In a power press having a rotatable driving member and a rotatable driven member, a clutch mechanism for connecting the driven member to the driving member, said mechanism comprising a friction shoe having an engaged position in which it engages the driving member and a disengaged position, a resilient member acting upon said shoe to force the same into its engaged position, and a toggle mechanism connected to said friction shoe and being in a substantially-locked position when the shoe is in its disengaged position, said toggle including two links and a pivot connecting said links, said pivot passing along a circular path during rotation of said clutch mechanism, and means for controlling said clutch mechanism, said latter means comprising a cam-like member adapted to be placed in the path of said pivot so as to place the toggle mechanism in its substantially-locked position, a box-rod having a position in which it receives the pivot from said cam-like member and a second position out of the path of the pivot, means to move said box-rod from the first position to the second position, and means actuated by the driven member to return said box-rod to its first position during rotation of the clutch mechanism.

10. In a power press having a rotatable driving member and a rotatable driven member, a clutch mechanism for connecting the driven member to the driving member, said mechanism comprising a pivot secured to said driven member and rotatable therewith, a friction shoe having one end supported by said pivot, a spring arranged to force said friction shoe into engagement with said driving member, a toggle mechanism connected to said friction shoe to hold the same against the action of said spring, said toggle mechanism being rotatable with said friction shoe and being in a substantially-locked position when said friction shoe is disengaged, and means adapted to be placed in the rotational path of said toggle to direct the same into its substantially-locked position.

11. In a power press having a rotatable driving member and a rotatable driven member, a clutch mechanism for connecting the driven member to the driving member, said mechanism comprising two pivots secured to said driven member and rotatable therewith, two friction shoes each rotatably supported at one end on one of said pivots, said shoe having engaged positions in which they engage said driving member and disengaged positions, a toggle mechanism having an open position and a substantially-locked position, said toggle mechanism comprising two links each having one end connected to the end of one of said shoes, a linking member having each of its ends connected to one of the other ends of said links and a compression spring arranged to force said toggle into its open position and said shoes into their engaged positions, a member adapted to be placed into the rotational path of said toggle whereby said toggle during its rotation with said driven member is moved into its substantially-locked position, and means to move said toggle from its substantially-locked position.

EDUARD KANN.